(12) United States Patent
Mih et al.

(10) Patent No.: US 8,408,373 B2
(45) Date of Patent: Apr. 2, 2013

(54) CLUTCH UNIT

(75) Inventors: Philippe Mih, La Wantzenau (FR); Bin Zhou, Buehl (DE); Matthias Zink, Ottenhoefen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1017 days.

(21) Appl. No.: 12/426,618

(22) Filed: Apr. 20, 2009

(65) Prior Publication Data

US 2009/0250301 A1 Oct. 8, 2009

Related U.S. Application Data

(63) Continuation of application No. PCT/DE2007/001746, filed on Sep. 27, 2007.

(30) Foreign Application Priority Data

Oct. 21, 2006 (DE) .......................... 10 2006 049 736

(51) Int. Cl.
*F16D 13/68* (2006.01)
*F16D 21/06* (2006.01)
*F16F 15/123* (2006.01)

(52) U.S. Cl. ............... 192/70.19; 192/55.61; 192/70.17; 403/359.4

(58) Field of Classification Search ................. 464/68.1, 464/68.6, 182; 403/359.2, 359.4, 359.5, 403/359.1–359.6; 192/55.61, 70.17, 70.19, 192/30 V See application file for complete search history.

(56) References Cited

U.S. PATENT DOCUMENTS

| 6,142,272 | A  | * | 11/2000 | Meisner et al. | ............... | 192/3.29 |
| 6,223,872 | B1 | * | 5/2001  | Heller et al.  | ................. | 192/3.29 |
| 7,665,590 | B2 | * | 2/2010  | Kroll et al.   | ................... | 192/48.8 |
| 8,096,885 | B2 | * | 1/2012  | MacDonald et al. | ........ | 464/68.6 |
| 2004/0055842 | A1 |   | 3/2004  | Bauer et al. | | |
| 2006/0289263 | A1 | * | 12/2006 | Friedmann et al. | .......... | 192/48.8 |
| 2007/0048082 | A1 | * | 3/2007  | Hoffmann et al. | ......... | 403/359.1 |
| 2008/0179157 | A1 | * | 7/2008  | Zhou et al. | ................... | 192/48.1 |

FOREIGN PATENT DOCUMENTS

| DE | 10 2005 027 608 | 12/2005 |
| DE | 10 2005 037 514 A | 3/2006 |
| EP | 1 686 278 A | 8/2006 |
| WO | 2007/000131 | 1/2007 |
| WO | 2007/000151 PA | 1/2007 |

* cited by examiner

*Primary Examiner* — David D Le
*Assistant Examiner* — Terry Chau
(74) *Attorney, Agent, or Firm* — Lucas & Mercanti, LLP

(57) ABSTRACT

The invention relates to a clutch unit, which has two subunits. One subunit is connected to the output shaft of an engine, and the other subunit is pre-mounted on the side of the transmission. Both subunits are coupled to one another via an axial plug-type connection, which includes meshing first profiles and second profiles.

2 Claims, 3 Drawing Sheets

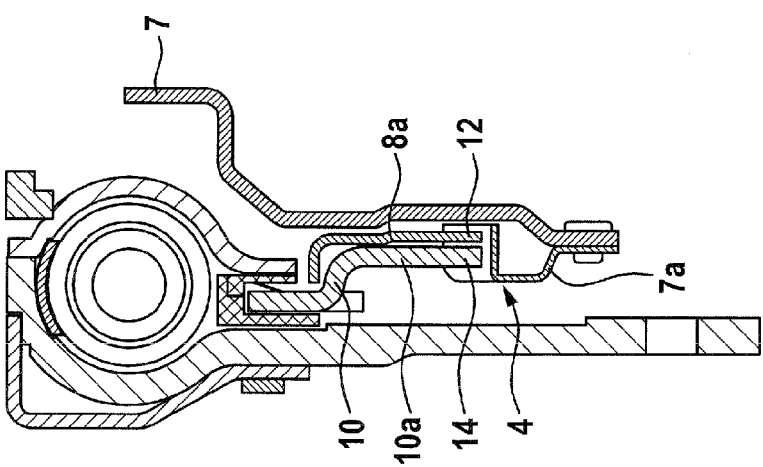
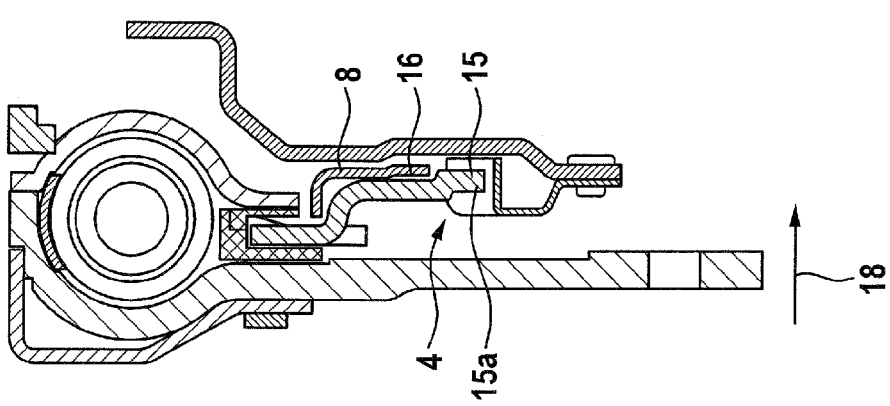
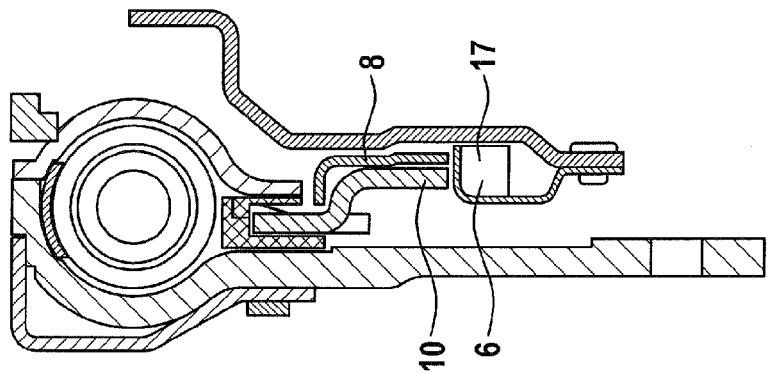

CLUTCH UNIT

This application is a continuation of PCT/DE2007/001746 filed Sep. 27, 2007, which in turn claims the priority of DE 10 2006 049 736.8 filed Oct. 21, 2006, the priority of both applications is hereby claimed and both applications are incorporated by reference herein.

The invention relates to a clutch unit or a clutch system, comprising at least two subunits, wherein one subunit can be connected to the output shaft of an engine, and the other subunit can be pre-mounted on the transmission side, and both subunits can be coupled to one another via an axial plug-type connection, which comprises mutually meshing first profile systems and second profile systems.

Clutch units which have two subunits which are coupled to one another drivingly only when the engine and transmission are assembled have been proposed, for example, by DE 10 2005 037514 A1 and DE 10 2005 027608 A1.

The present invention was based on the object of providing a connection between the two subunits which ensures proper transmission of torque and which can be produced by simply joining the two subunits axially. The connection according to the invention is intended to avoid impact noises or clattering noises, in particular, owing to torsional vibrations, wobbling vibrations and axial vibrations of components. Furthermore, satisfactory intervention of the first and second profile systems is to be ensured and the connection which is formed as a result is to have a comparatively short axial structure.

According to the invention, this is achieved in a clutch unit or a clutch system of the type mentioned at the beginning by virtue of the fact that at least some of the tooth-shaped profiles which form the first and second profile systems are tensioned in the circumferential direction by means of a tensioning element, wherein the tensioning element has at least some tooth-shaped profiles and is supported by a component which has the first or second profile systems, and the tensioning element is tensioned with respect to the component in the circumferential direction by means of at least one energy store, wherein, furthermore, the tooth-shaped profiles of the tensioning element and tooth-shaped profiles of the component which supports the tensioning element are arranged axially one next to the other or one behind the other, and the component which supports the tensioning element has further tooth-shaped profiles in the circumferential direction between the tooth-shaped profiles of the tensioning element, which further tooth-shaped profiles are at least partially offset axially in the direction of the tooth-shaped profiles of the tensioning element. The profiles of the tensioning element and the axially offset, further profiles of the component which supports said tensioning element can at least partially overlap in the axial direction. The axial offset of the further profiles of the component which supports the tensioning element is preferably directed in the mounting direction or fitting-on direction between the first and second profile systems.

Such a configuration of the profile systems which ensure the axial plug-type connection ensures a reduced overall length of the plug-type connection and satisfactory circumferential support of the tooth-shaped profiles of the first and second profile systems. Satisfactory overlap of the toothing systems in the axial plug-type connection is therefore ensured.

Further expedient structural and functional configuration features of a clutch unit according to the invention are explained in more detail in conjunction with the description of the figures which now follows.

In the drawings:

FIGS. 3, 4 and 5 show sections corresponding to lines III-III, IV-IV and V-V in FIG. 2.

Figure 1:
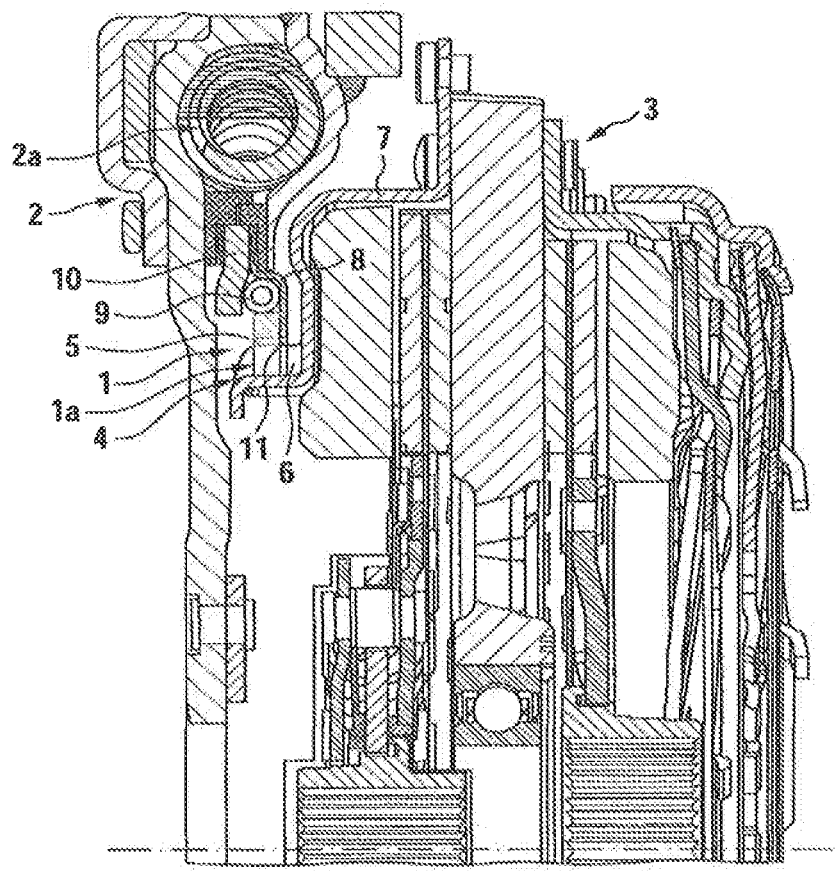
FIG. 1 shows a half-section through a clutch unit.

FIG. 1 shows a drive connection 1 which is embodied as an axial plug-type connection 1*a*. Two subunits 2 and 3 can be connected to one another via this axial plug-type connection 1*a*, the subunit 2 of which subunits forms a damper which can be connected to the output shaft of an internal combustion engine, and the subunit 3 of which subunits contains, in the illustrated exemplary embodiment, a double clutch which can be pre-mounted on the transmission side.

The axial plug-type connection 1*a* is formed by a toothing connection 4 which has toothing profiles 5 and 6 which mesh with one another. In the illustrated exemplary embodiment, the toothing profile 5 is supported by a flange-like output part 10 of the damper 2*a*, and the toothing profile 6 is supported by a driver ring 7, which is a component of the subunit 3 which is pre-mounted on the transmission side. The toothing profile 5 forms an internal toothing, whereas the toothing profile 6 forms a correspondingly matched external toothing.

In order to ensure circumferential tensioning of the toothing profiles 5 and 6, a tensioning element 8 is provided which is acted on in the circumferential direction by at least one energy store 9, which is embodied here as a helical compression spring. However, the energy store 9 can also be of different design, for example the tensioning element 8 which is embodied here in an annular shape could have bending-beam-like arms which are elastically pre-tensioned and generate a circumferential force, at least on the tensioning element 8. Such arms can be supported with corresponding pre-tensioning on the component 10. The energy store 9 is installed tensioned between the components 10 and 8 in the circumferential direction.

Figure 2:
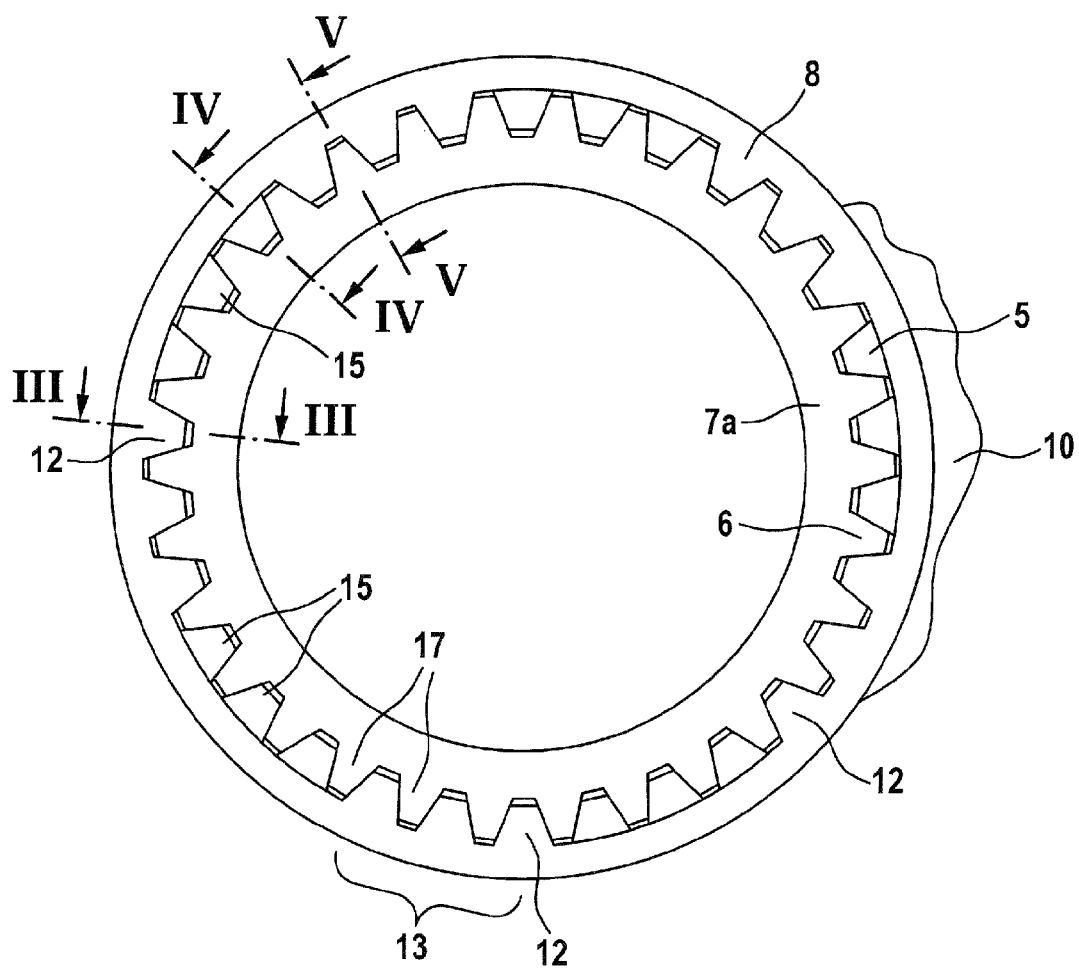
FIG. 2 shows a schematic or simplified view of an axial plug-type connection which is used in the clutch unit according to FIG. 1.

The figures used below differ slightly from the embodiment according to FIG. 1, since in said figures the toothing profile 6 is not configured in one piece with the driver ring 7, but rather formed by a separate component 7*a* which is connected to the driver ring 7 in a rotationally fixed fashion, for example by means of welding or riveting. The schematic illustration in FIG. 2 shows the tensioning element 8, illustrating the component 7*a* which has the toothing profile 6 and the toothing profile 5 of the flange-like output part 10 of the damper 2. Since the flange-like output part 10 is located axially behind the tensioning element, the flange-like output part 10 is covered by the tensioning element 8 in the region of the latter.

FIG. 2 shows that the tensioning element 8, which has an annular shape here, has a plurality of groups 13 of teeth 12 which are distributed uniformly over the circumference here. In the illustrated exemplary embodiment, each group 13 comprises three teeth 12. As is apparent from FIG. 3, these teeth 12 cover the teeth 14 of the flange-like output part 10. The teeth 12 and 14 are therefore axially adjacent. The flange-like output part 10 has further teeth 15 which, viewed in the circumferential direction, are located between the groups 13 of teeth 12, and respectively the teeth 14 covered thereby. FIG. 4 illustrates such a tooth 15. From FIG. 4 it is also apparent that in the region of these teeth 15 the tensioning element 8 does not have any teeth but instead merely segment-shaped regions 16 or regions 16 which run in the circumferential direction and extend between the groups 13 of teeth 12.

FIG. 5 shows a section through a region in which both the flange-like output part 10 and the tensioning element 8 have a tooth gap for receiving a tooth of the toothing profile 6. FIG.

3 shows that the region 8a of the tensioning element 8 is axially offset with respect to the radially outer regions of this part, with the result that there is a short distance between the region 8a and the regions 10a of the flange 10.

FIG. 4 shows that at least regions 15a of the teeth 15, preferably the entire teeth 15, have an offset in the axial direction with respect to the regions of the flange-like output part 10 which lie radially further out. This offset is embodied axially in the direction of the tensioning element 8. FIGS. 3 and 4 show that as a result of this axial offset the teeth 15 overlap circumferentially with the teeth 12 of the tensioning element 8. FIG. 4 shows that the axial offset of the teeth 15 is embodied in the direction 18 in which the subunit 2 on the engine side is pushed onto the subunit 3 on the transmission side. The axial offset of the teeth 15 also ensures proper toothing overlap between the teeth 15 and the teeth 17 of the toothing profile 6, while allowing for all the axial tolerances which the individual components have. As a result, proper support between the edges of the teeth 15 and the teeth 17 is ensured, which allows deflection of the toothing connection 4 to be avoided.

The distribution of the teeth 12 which is illustrated in FIG. 2 serves merely as an example. This distribution can also be different depending on the application, for example just three groups 13 of teeth 12 may be provided, in which case these groups 13 can also have just two teeth or more than three teeth. It is also possible to provide individual teeth 12 which alternate with teeth 15 in the circumferential direction.

With respect to the embodiment and the function and arrangement of the tensioning element 8, reference is further made to the prior applications PCT/DE2006/000995 and PCT/DE2006/001100.

LIST OF REFERENCE NUMERALS

1 Drive device
1a Axial plug-type connection
2 Subunit
2a Damper
3 Subunit
4 Toothing connection
5 Toothing profiles
6 Toothing profiles
7 Driver ring
8 Tensioning element
8a Region
9 Energy store
10 Flange-like output part
10a Region
11 . . .
12 Teeth
13 Group
14 Teeth
15 Teeth
16 Regions
17 Teeth
18 Pushing-on direction

The invention claimed is:

1. A clutch unit, comprising:
at least two subunits, one subunit is connected to an output shaft of an engine and the other subunit is pre-mounted on a transmission side of the engine, both subunits are coupled to one another via an axial plug-type connection, which comprises first profile systems and second profile systems,
a plurality of first tooth-shaped profiles forms the first profile systems and a plurality of second tooth shaped profiles forms the second profile systems, the first tooth-shaped profiles in meshed engagement with the second tooth-shaped profiles, wherein one of the first tooth-shaped profiles and the second tooth-shaped profiles is tensioned in a circumferential direction by a tensioning element, the tensioning element has a plurality of tensioning tooth-shaped profiles and is supported by a component which has the one of the first tooth-shaped profiles and the second tooth-shaped profiles, and wherein the tensioning element is tensioned with respect to the component in the circumferential direction by at least one energy store,
wherein the one of the first tooth-shaped profiles and the second tooth-shaped profiles includes:
a corresponding group of tooth-shaped profiles, the tensioning tooth-shaped profiles of the tensioning element and the corresponding group of tooth-shaped profiles being respectively arranged axially one next to the other, and
further tooth-shaped profiles in the circumferential direction between the tensioning tooth-shaped profiles of the tensioning element, the further tooth-shaped profiles are at least partially offset axially relative to the corresponding group of tooth-shaped profiles in the direction of the tensioning tooth-shaped profiles of the tensioning element.

2. The clutch unit as claimed in claim 1, wherein the tensioning tooth-shaped profiles of the tensioning element and the further tooth shaped profiles at least partially overlap in a circumferential direction.

* * * * *